US006772196B1

(12) United States Patent
Kirsch et al.

(10) Patent No.: US 6,772,196 B1
(45) Date of Patent: Aug. 3, 2004

(54) ELECTRONIC MAIL FILTERING SYSTEM AND METHODS

(75) Inventors: Steven T. Kirsch, Los Altos Hills, CA (US); Kenneth P. Kiraly, Menlo Park, CA (US)

(73) Assignee: Propel Software Corp., San Jose, CA (US)

( * ) Notice: Subject to any disclaimer, the term of this patent is extended or adjusted under 35 U.S.C. 154(b) by 747 days.

(21) Appl. No.: 09/626,600

(22) Filed: Jul. 27, 2000

(51) Int. Cl.[7] .............................................. G06F 15/16
(52) U.S. Cl. ........................... 709/206; 709/207; 707/5
(58) Field of Search ................................. 709/200, 206, 709/207; 707/5

(56) References Cited

U.S. PATENT DOCUMENTS

| | | | | |
|---|---|---|---|---|
| 5,898,836 A | * | 4/1999 | Freivald et al. | 709/218 |
| 5,941,944 A | * | 8/1999 | Messerly | 709/203 |
| 6,052,709 A | * | 4/2000 | Paul | 709/202 |
| 6,161,130 A | * | 12/2000 | Horvitz et al. | 709/206 |
| 6,314,421 B1 | * | 11/2001 | Sharnoff et al. | 707/5 |
| 6,330,590 B1 | * | 12/2001 | Cotten | 709/206 |
| 6,434,524 B1 | * | 8/2002 | Weber | 704/257 |
| 6,460,050 B1 | * | 10/2002 | Pace et al. | 707/104.1 |
| 6,480,291 B1 | * | 11/2002 | Daniels et al. | 358/1.11 |
| 6,546,390 B1 | * | 4/2003 | Pollack et al. | 707/7 |
| 6,546,416 B1 | * | 4/2003 | Kirsch | 709/206 |
| 6,654,787 B1 | * | 11/2003 | Aronson et al. | 709/206 |

OTHER PUBLICATIONS

Brin et al. "Copy Detection Mechanisms for Digital Documents", SIGMOD'95, ACM Press, pp. 398–409, 1995.*
Spertus, E. "Smokey: Automatic Recognition of Hostile Messages", IAAI'97, 1997.*
Vipul's Razor, pages from razor.sourceforge.net printed Sep. 17, 2003, note 1st public release date of May 21, 2000.*
Hoffman, *Unsolicited Bulk Email: Definitions and Problems*, Oct. 5, 1997.
Gartner Consulting, *ISPs and Spam: The Impact of Spam on Customer Retention and Acquisition*, Jun. 14, 1999.
Brightmail, Inc., *Prominent Industry Leaders Support Brightmail's New Solution to Fight Spam*, Jul. 20, 1998.
Brightmail, Inc., *Internet Services Providers and Enterprise Messaging Industry Rally . . .* , Mar. 29, 1999.

* cited by examiner

Primary Examiner—Hosain Alam
Assistant Examiner—David Lazaro
(74) Attorney, Agent, or Firm—NewTechLaw; Gerald B. Rosenberg, Esq.

(57) ABSTRACT

The system filters-out undesirable email messages sent to a user email address. The system includes a data store providing updateable storage of signature records that correspond to a subset of undesirable email messages that may be sent to the predetermined email address. An email filter processor is coupled to the store of signature records and operates against the email messages received at the predetermined email address to identify and filter-out email messages corresponding to any of the signature records. An update system is provided to automatically receive a set of signature records, which are then used to update the plurality of signature records stored by the data store. The system can be implemented to include at least a portion of the email processor system within a client site email transport system, which receives the email messages addressed to the set of email addresses assigned or associated with the client site, including the predetermined email address.

3 Claims, 6 Drawing Sheets

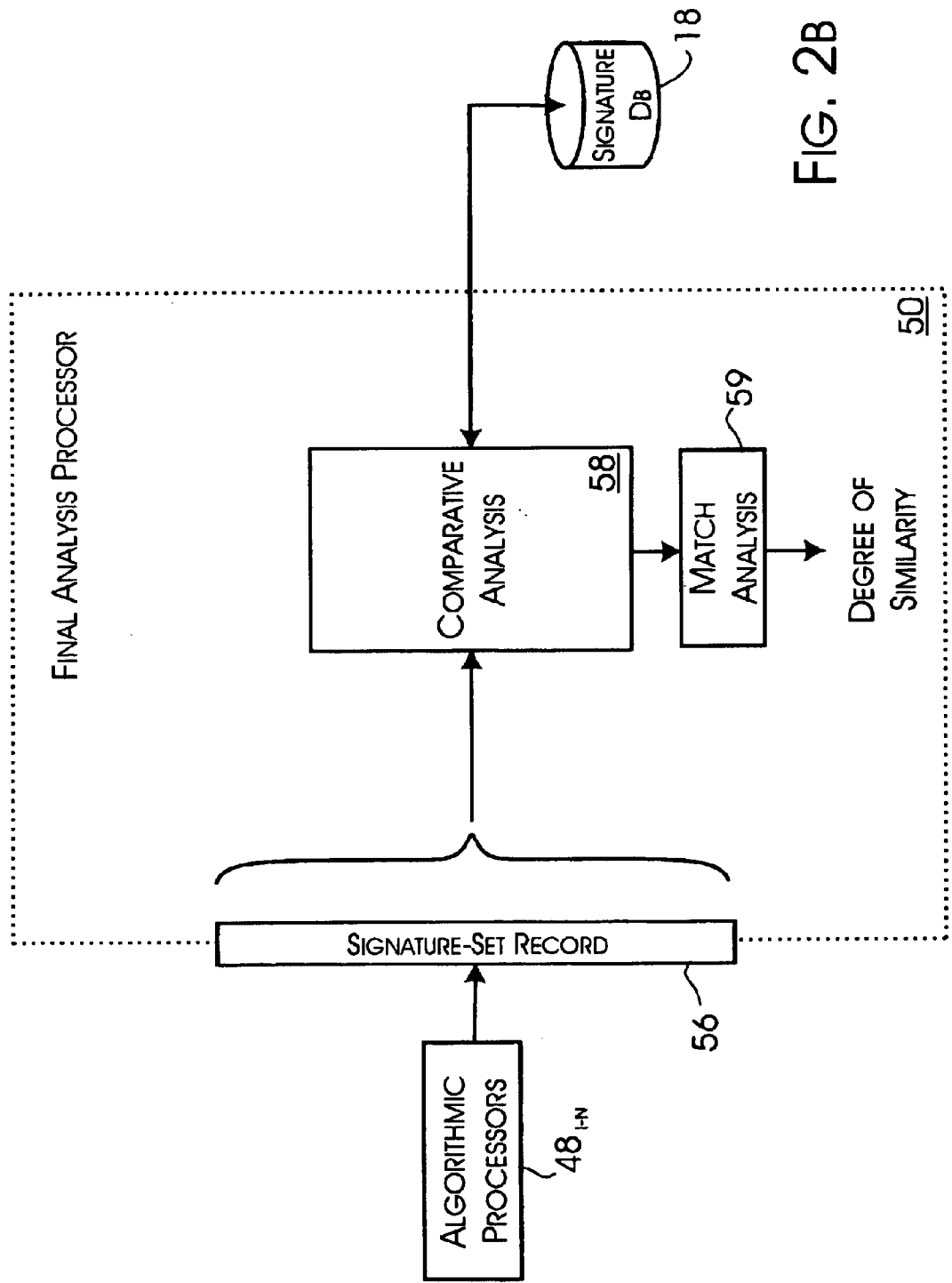

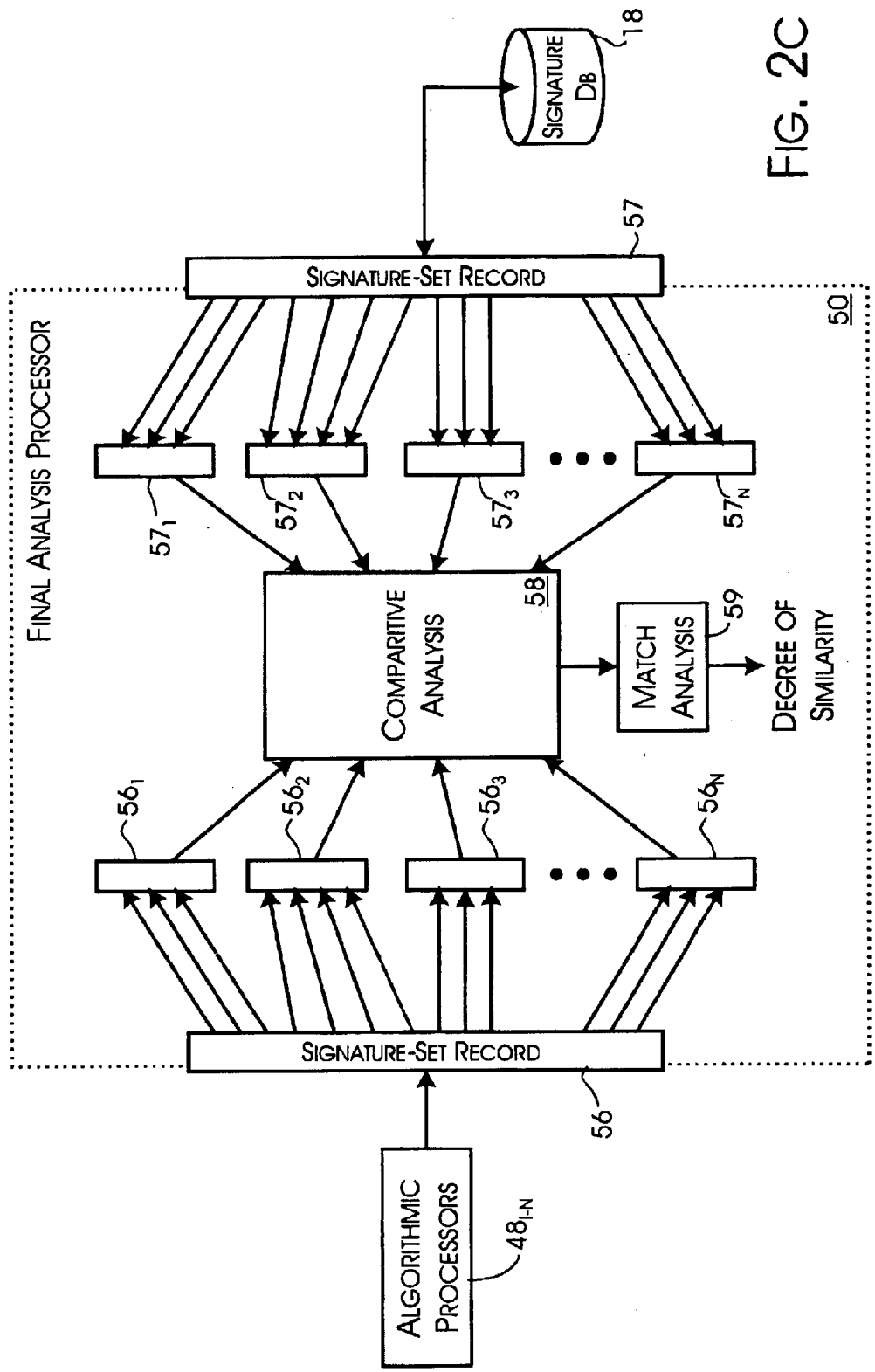

ELECTRONIC MAIL FILTERING SYSTEM AND METHODS

BACKGROUND OF THE INVENTION

1. Field of the Invention

The present invention is generally related to automated systems for blocking receipt of undesired electronic mail and, in particular, to a system and methods for reliably detecting and filtering out undesired and unsolicited electronic mail stealthily prepared specifically to avoid detection by conventional filtering systems.

2. Description of the Related Art

The use of electronic mail (email) is widely accepted to the extent that email is often considered an essential tool in conducting business and communicating between individuals. Key aspects of the adoption of email for such use include the immediacy of the communication, the ability to specifically identify and define recipients by email addresses, that email addresses are often publically available by choice and by standard operation of conventional Internet tools, and the normally user-to-user personal nature of email messages.

A number of different uses of email have evolved beyond the most basic person-to-person communications. One of the earliest developments was the use of list-servers (Listserv) to broadcast email messages sent to the Listserv to a well-defined and selective list of Listserv subscribers. Another development was the direct use of email lists to send announcements and other notices to subscriber lists. Similarly, electronic periodicals and information clipping services often use email lists to distribute content or content summaries to subscribing users.

A generally undesired use of email, hereinafter referred to as the delivery of undesired email (UEM) and loosely referred to as "spam" email or "spamming," is the typically unsolicited mass emailings to open or unsubscribed email addresses. Other names, such as Unsolicited Bulk Email (UBE) are also used to describe the same problematic email. Information describing the problems and attempts to deal with UEM is available from the Internet Mail Consortium (IMC; www.imc.org). The impact of UEM is generally assessed in a survey, *ISPs and Spam: The Impact of Spam on Customer Retention and Acquisition*, Engagement #1802565, by the GartnerGroup, San Jose, Calif. In summary, UEM is received by some 90% of email users with publically accessible email addresses. Estimates vary greatly on the financial impact of UEM on the businesses and services, both large and small, that receive or unintentionally forward UEM to users. Although the individual costs of email message delivery are quite small, the size of mass-emailings creates real costs in terms of connectivity, temporary storage, and auditing. Even the cost to individual users may be significant, since many pay directly for connectivity time.

The email addresses used by UEM vendors are typically harvested from the Internet through scans of the information available on the Web, Usenet postings, and the various user directories and lists accessible through the Internet. For example, corporate Web pages may include an email address list of the different employees of the company. Postings to the public Usenet forums and hosted chat-rooms provided by different services often include the email address of each user who posts a message. User addresses may also be directly, though typically indirectly obtained from the different Listservs and subscriber list services that operate over the Internet.

Various email address harvesting tools, ranging from the simple to quite complex and tailorable to scan the Internet using many different scanning techniques, are conventionally available from a variety of sources. Therefore, virtually any user can set up as a mass-emailing vendor of UEM messages. Such UEM vendors typically hide the address and other source identifiers of their mass-mailings, relay their mass-emailings through third-party email forwarding gateways, further change their internet service providers (ISPs) to obscure their identity. Consequently, there is no effective mechanism currently available that will permit or enable users to avoid having their email addresses harvested. There is also no simple way users can pre-identify and refuse email messages from UEM vendors.

A number of products and services exist that attempt to identify and filter UEM messages from the ordinary email received by their users. The general operating principles of these systems are documented in *Unsolicited Bulk Email: Mechanisms for Control*, Internet Mail Consortium Report: UBE-SOL, IMCR-008, revised May 4, 1998. In general, conventional products and services rely on specific identification of known UEM vendors by source address, the specific content of manually identified UEM content, or heuristic-based identification of UEM messages.

Conventional heuristic-based systems, which are generally more effective that specific identification systems, are executed by a host computer system to review and filter already received email messages into ordinary and UEM categories prior to actual delivery to the email addressees. These systems may utilize a variety of different analyses of email message content to discern UEM, including key-word and key-phrase detection, which are predefined or learned over time and improper and missing email header fields. The predefined keys are static and typically include occurrences of "$$$" and variations of "make money fast." Learning of other key-words and phrases conventionally requires manual intervention. UEM vendors, however, are known to be highly creative and have generally demonstrated that these heuristics can be defeated by selective crafting of the content of the UEM message through the use of automated technical mechanisms.

A known problem with heuristic systems is that the heuristics, operative at a level sufficient to identify a bulk of UEM received by a user, also create a substantial likelihood that non-UEM messages will be improperly identified and filtered. Any loss of non-UEM messages, however, is generally considered completely unacceptable by users. As a result, there does not appear to be any reliable and practically acceptable way to prevent the harvesting of email addresses, and thereby controlling the ability of UEM vendors from originating their mass-mailings, or to reliably identify UEM messages once received.

Consequently, there is a clear need for some reliable and effective manner of detecting and filtering out UEM messages from the stream of email messages received by email users.

SUMMARY OF THE INVENTION

Thus, a general purpose of the present invention is to provide an efficient method and system for qualifying and thereby providing a basis for protecting users against receipt of UEM messages.

This is achieved in the present invention by providing a method and system that actively qualifies undesirable email messages sent to the email address of a user-recipient. The content of a received email message is processed to produce multiple signatures representing aspects of the contents of the received email message. These signatures are compared against a database of signatures produced from a plurality of presumed undesirable email messages. A relative-identity of the signatures is scored to provide a basis for distinguishing the received email message from the presumed undesirable email messages.

The multiple signatures generated to represent the received email are produced as digest of algorithmically selected portions of the received email with the signatures defined by like algorithms being comparable. The rate of comparison matches between the multiplicity of suspect email message signatures and the signatures stored by the database serves as the basis for distringuishing the received email message from the presumed undesirable email messages.

The system includes a data store providing for updateable storage of signature records that correspond to undesirable email messages potentially sent to the user-recipient email address. An email filter processor is coupled to the store of signature records and operates against the email messages received to discern and qualify email messages determined by the system to sufficiently correspond to the signature records. The store of signature records is coupleable to automatically receive signature records corresponding to additional instances of undesirable email messages, which are then stored to the data store for subsequent use in comparisons.

The system can be implemented to include at least a portion of the email processor system within a client site email transport system, which receives the email messages addressed to the set of email addresses assigned or associated with the client site, including the predetermined email address.

An advantage of the present invention is that, through an effectively reverse harvesting of UEM vendors, a controlled yield of UEM is made available to the system as a basis for qualifying and potential filtering-out of UEM sent to protected users.

Another advantage of the present invention is that the signature records generated through processing of UEM messages effectively implement one-to-many relationship between an undesirable email, as directed to a recipient-user, and the UEM represented by the signatures stored in the data store. Thus, comparison of the signatures of a suspect email with those contained in the stored signature records enables both ordinary and intentionally created variants of UEM messages to be automatically detectable by the system.

A further advantage of the present invention is that a broad set of algorithms may be implemented as a basis for generating signature records, with only subsets of the algorithms used for particular signature records. A UEM vendor, therefore, cannot reasonably anticipate a particular subset of algorithms to evade in preparing a UEM message, since the subset is not static at least over time. Furthermore, variants of the top-level set of algorithms as well as new algorithms may be introduced with the effect that the top-level set of algorithms is not necessarily closed.

Still another advantage of the present invention is that the algorithms, based on their different basis for determining content similarity, are automatically resilient against ordinary and intentional variations. The resulting scoring of potential UEM messages is based not on exact identities, but on similarity matching. A particular signature record with therefore match the variants of a UEM message that might be produced by automated rewriting. Complex rewriting of individual UEM messages, requiring direct and non-automatable involvement of the UEM vendor, is both impractical and unprofitable for a UEM vendor.

Yet another advantage of the present invention is that a centrally maintained and managed server can be efficiently operated to collect, analyze, and produce signature records. By the proxy collection of UEM, the server is highly-responsive to new mass emailings of UEM and can quickly prepare and hot-update client-site filtering systems against at least any further passage of these UEM messages. Further, the server can automatically update the client systems with new algorithms and specifying different selections of algorithms for use in connection with particular signature records. As a result, client site administration is essentially automatic, yet maintained entirely up-to-date under the secure control of the server. The operation of the server, however, is also substantially autonomous. Little or no human interaction is required on an ongoing basis to manage or operate the system of the present invention. Specifically, no human interaction or contribution is required in order for the present system and methods to develop UEM message signatures. These signatures are automatically developed and distributed.

A still further advantage of the present invention is that the algorithmic operations of the server in analyzing potential UEM and the client in detecting UEM is both fast and highly-reproducible. Computational speed is proportional to and primarily controlled by the size of an email message being processed. A secondary consideration is the computational complexity of the algorithms. In the preferred embodiments of the present invention, the computational complexity is little greater than the computation of checksums of text characters.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 2B is a partial detail block diagram of a preferred embodiment of the final analysis processor shown in FIG. 2A;

FIG. 2C is a partial detail block diagram of an alternate embodiment of the final analysis processor shown in FIG. 2A;

DETAILED DESCRIPTION OF THE INVENTION

The present invention provides a system and methods for reliably detecting and identifying UEM. Although the preferred embodiments of the present invention apply primarily to electronic mail messages, the present invention is fully applicable to other, at lease purportedly, user-to-user messages passed using other protocols and composed and read using non-email specific client applications. User-to-user messages can be passed using listserv protocols, as well as the more recent protocols developed to support internet relay chat (IRC), AOL® Instant Messenger™, and netnews messages transported by the network news transport protocol (NNTP). Where the content of such other user-to-user messages would qualify as undesirable in the manner considered for UEM, then the messages themselves are UEM within the scope of the present invention.

Figure 1:
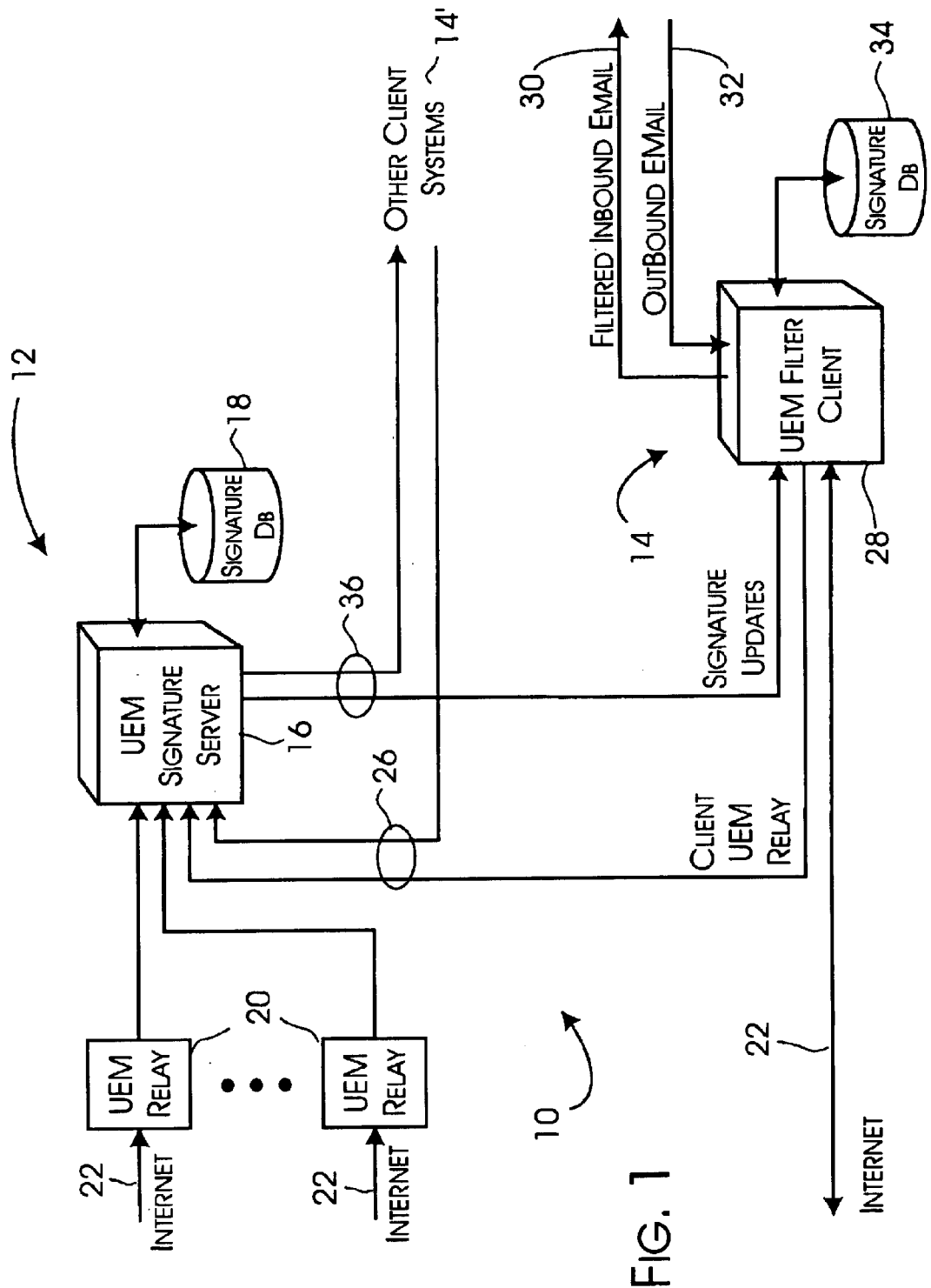
FIG. 1 is a block diagram of an email filter system constructed in accordance with a preferred embodiment of the present invention.

As illustrated in FIG. 1, preferred embodiments of the present invention, such as the system 10, utilize a server system 12 to collect and identify UEM through the generation of signature record sets and any number of client systems 14, 14' that, based on the signature record sets, identify and filter-out the corresponding UEM received at their local sites. The UEM server system 12 preferably includes a signature server 16, a store for signature record sets 18, and some number of UEM relay systems 20, with at least one being required. These relays 20 may be email-enabled computer systems physically located local or remote relative to the UEM server 16 or may even be hosted as virtual systems by the UEM server 16 itself. Preferably, the configuration and operation of the UEM relays 20 is managed cooperatively with that of the UEM server 16.

In a preferred embodiment of the present invention, twenty to more than a hundred UEM relay systems 20 are established with access to the Internet 22. Each UEM relay 20 is preferably associated with a large number of decoy email addresses, totaling thousands to several millions of unique email addresses for the full complement of UEM relays 20. The UEM relays 20 are connected to the Internet 22 through different ISPs. Preferably, the selected ISPs are large email forwarders, whose blanket avoidance by UEM vendors would severely compromise any potential benefit of a UEM mass-mailing. Additionally, any Internet visible identification of the UEM relays 20 is preferably changed aperiodically to prevent any easy identification of the UEM relays 20 through their ISP hosts.

The decoy email addresses supported by the UEM relays 20 are published through various means to be available to harvester tools. In particular, public directories can be used to list the decoy addresses so as to appear indistinguishable from legitimate email addresses to harvester tools. These directories are preferably published through legitimate Internet directory services, including the InterNIC™ and the many commercial listing services that support publically accessible directories of users. Web-based directories can also be posted. Another preferred method of publishing is to post messages to the different publically accessible newsgroups, chat-rooms, and Listservs with the decoy mail addresses provided in the reply-to header field or body of the message.

The UEM relays preferably operate to forward 24 all email messages directed to the decoy addresses to the UEM server 16. In a preferred embodiment of the present invention, the email is simply forwarded 24 using the simple mail transport protocol (SMTP) to an unpublished email address hosted by the UEM server 16. Should a need arise, the email may be forwarded using a non-standard SMTP port number or a different transport protocol.

In an alternate preferred embodiment of the present invention, the UEM clients 14, 14' may also host directories that publish email addresses, including decoy addresses, identified with the client domain. Since these decoy addresses also do not correspond to any actual user, any email received by these domain specific email accounts can be considered to be UEM. Preferably, these email messages are selectively forwarded 26 to the UEM server 16 in the same manner UEM messages are forwarded 24 by the UEM relays 20. Thus, even UEM selectively targeted to specific domains may be detected and ultimately filtered-out.

UEM messages forwarded 24, 26 from the relays 20, 14, 14' are preferably processed by the UEM server 16 to generate corresponding sets of signature records storable by a signature database 18. For purposes of the present invention, a signature is some value or condition that represents some aspect, typically some portion of the content, of a particular email. Signatures generated in a like manner for an email are at least logically collected as a signature record. That is, the signatures of a signature record reflect different views of the email message content. These views are preferably constructed or calculated in the same or like manner, but operate over different selected, potentially overlapping, portions of the header fields and body of the email contents. In turn, a signature record set, containing multiple signature records, corresponds to a full representation of the contents of an email received by the UEM server 16.

A separate signature record set is not necessarily generated and stored for every UEM message received. Rather, the UEM server 16 determines whether the signature record set for a received email is already in the signature database 18. While an identity comparison between a new signature record set and those previously stored in the signature database 18 could be used, a sufficient comparison can be made by only comparing selected signatures from the new signature records with the signatures of signature records previously stored in the signature database 18. This has the effect of comparing a received email against a broad set of variants of the emails previously evaluated by the UEM server 16, but without requiring a signature record set to have been stored for each of those emails. Thus, by basing the comparison on the use of only a subset of the signature record set, or a signature-set, the comparison implicitly encompasses variants of UEM not actually received previously as email by the UEM server 16. The use of signature-set and the comparison of signatures from like signature records is preferred.

The UEM clients 14, 14' are preferably based on conventional computer server systems 28 that support an SMTP gateway between the Internet 22 and users transferring email messages through the gateway. For non-SMTP based messages, a gateway or proxy for the corresponding transport protocol can be similarly used. In accordance with the preferred embodiments of the present invention, the gateway or proxy, such as the SMTP gateway shown, is modified to support an analysis and filtering function at least with respect to email messages received from a communications network, such as the Internet 22. Thus, the UEM client 28 operates to deliver filtered inbound email 30 messages to the email account users of the UEM client 28', while allowing, email outbound 32 from the UEM client 28 sites to be passed to the Internet 22 without delay. If a client site allows internal email messages to reach and be routed by the UEM client 28, these messages are preferably treated as trusted and returned as part of the filtered inbound email 30 messages.

The modified SMTP gateway utilized by the clients 14, 14' of the present invention preferably also processes inbound email messages from the Internet 22 by subjecting the messages to a multi-part analysis. In general, the signature record set produced by this analysis is then compared to the signature record sets retrievable from the client signature database 34. In general terms, if a signature-set match is found within predetermined tolerances, the message is filtered-out. More specifically, these comparisons enable the generation of similarity scores by evaluating the match rate of various subsets of signature records, combining the scores typically through an averaging operation, and potentially adding in additional signature characterizing values determined through the comparisons to reach a final similarity score for a signature record set. This final score is then compared against a preset threshold to finally determine whether the corresponding inbound message should be recognized or identified as a UEM message and accordingly filtered.

In a preferred embodiment of the present invention, the filtering-out is performed by adding a defined UEM notation, such as "SPAM," to a standard header field, such as the subject line header, of the inbound message. Alternately, a proprietary header field, possibly named "X-spam," could be added to the inbound message. To prevent external interference with this alternative marking system, the name of any proprietary header field is specifically chosen not to correspond to any publically accepted or recognized header field name. Preferably, though optionally, a numeric percentage value denoting the degree of certainty that the message is UEM is added to the same header. This field value may be alternately presented as a defined word, such as "Low," "Medium," or "High," where multiple thresholds are defined, to reflect the highest threshold value exceeded by the message content. Thus, the absence of a UEM notation in a specific header or a degree of certainty value of less than some defined percentage threshold value is preferably considered a non-UEM message indicator. In order to avoid outside interference with this marking scheme, any UEM notation or degree of certainty value present on an inbound message is removed or ignored.

Conventional email-client applications can then further filter these UEM marked messages directly into a trash queue or specifically segregated into some "suspected UEM" inbound email queue that a user can later summarily review and clean as appropriate. Where multiple threshold values are supported by the present invention, the email client readers may be configured to recognize each threshold value and apply a separate filter rule to specify a corresponding disposition for the differently identified messages.

Finally, the UEM server 16 preferably distributes 36 signature record sets as hot-updates to UEM clients 28. Thus, as updates are received by a UEM client 28, the signature record sets are installed into the signature database 34 and immediately made available to the UEM client 28 for use in evaluating email messages inbound from the Internet 22. Preferably, the hot-updating process is initiated by the UEM server 16 on or in connection with determining that a newly generated signature record set is not currently present in the signature database 18. The immediacy of the distribution of these new signature record sets minimizes the exposure of the UEM client system 14, 14' sites to new, unidentified UEM emailings. For practical purposes then, the exposure to such new UEM emailings is determined by the delay between the beginning of a new UEM mass-emailing and the first receipt of a corresponding UEM message at a decoy email address. Provided a sufficient number of decoy email addresses are published and harvested in advance of a UEM mass-emailing, the detection and filtering-out of UEM messages can easily be greater than 98% and, with tuning of the filtering operation of the server and client systems 12, 14, may very closely approach 100%.

Figure 2A:
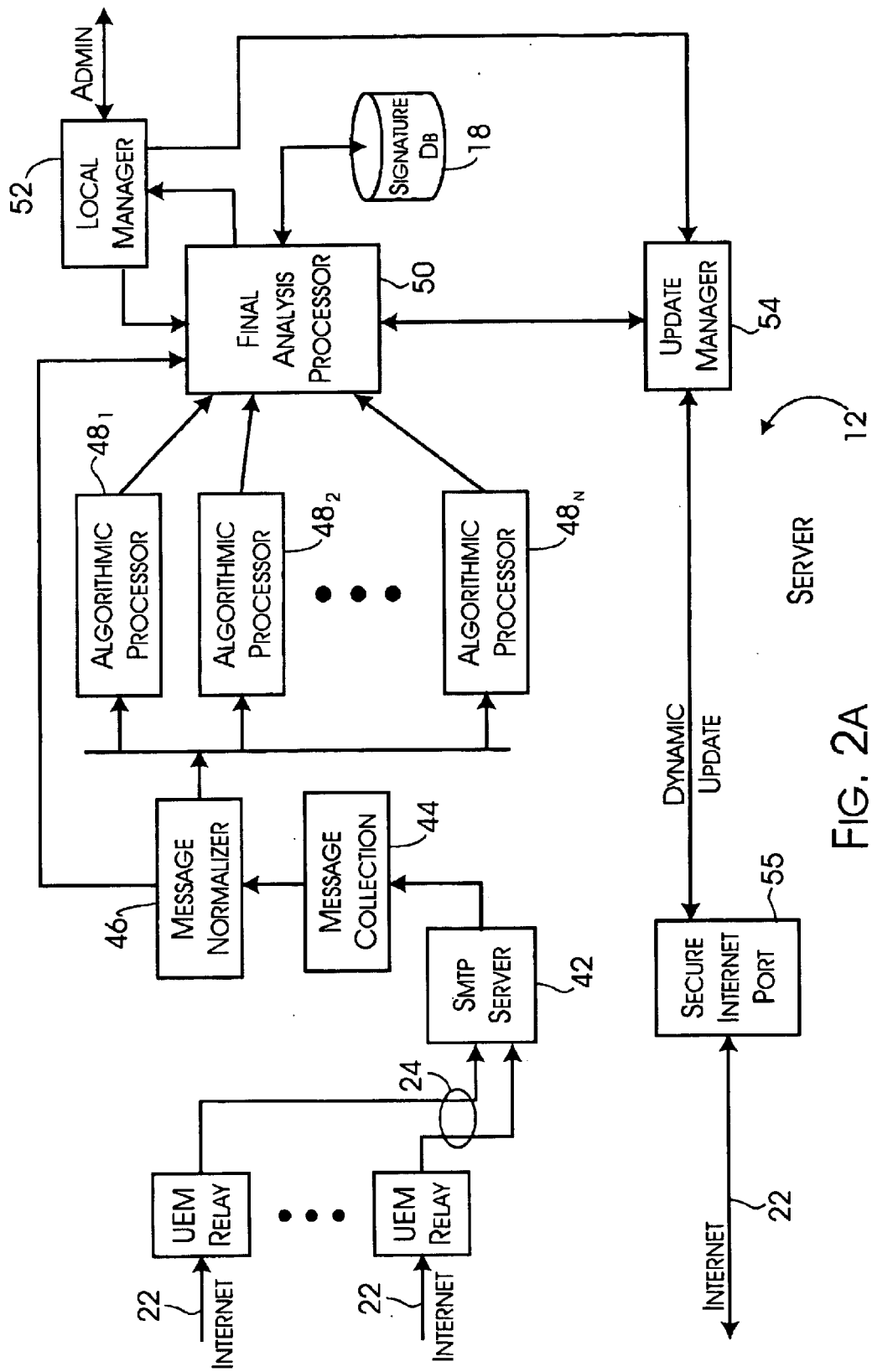
FIG. 2A is a block diagram of an email signature server constructed in accordance with a preferred embodiment of the present invention.

A preferred embodiment of the UEM server 12 is shown in greater detail in FIG. 2A. An SMTP server 42 receives the forwarded UEM messages collected by the UEM relays 20. The received messages are queued through a message collection queue 44 and a message normalizer 46. The collection queue 44 is provided simply to buffer a sequence of UEM messages awaiting processing though the normalizer 46.

The message normalizer preferably performs two functions: conversion of the content form of each message as sequentially received from the collection queue and normalizing or re-rendering certain context features of the UEM message that are deemed, in accordance with the present invention, to have little or no analytical value in identifying UEM content. The preferred form conversions are presented in Table I below:

TABLE I

Message Content Form Conversion

| | |
|---|---|
| Multiple forms: | select the text/plain version. |
| HTML form only: | <br> and <p> convert to single and dual line returns, strip characters and codes inside < > and convert &entities (&nbsp; &quot, etc.) to ordinary characters. |
| Other forms: | reduce to a plain text equivalent. |

Other form conversions may be similarly implemented as different forms are identified adopted for use in connection with email messages. For example, extensible markup language (XML) documents may soon be adopted for the transport of email content. In general, XML documents may be treated like hypertext markup language (HTML) documents, since both are derivative subsets of a broader document description standard known as standard generalized markup language (SGML). Extensions to the HTML form conversions may need to be adopted to handle XML, though the goal of generally reducing the content to a plain text form remains.

Normalization of the content of a message is then performed to effectively standardize the presentation of the content. This content normalization process is intended to remove distinctions from the message content that do not carry repeatably identifying information. Such content distinctions are generally of a nature that do not affect or interfere with the substance of the content presentation. These distinctions are generally of a nature that allow for random insertion of characters or varying the presentation of existing characters in a non-substantive way. For example, randomly selected numbers or odd characters can be inserted at the end of lines or sentences, extra spaces between words, and blank lines between paragraphs. Also, the capitalization pattern of existing characters and the number of punctuation marks used can be varied without affecting the overall presentation of the content. The normalization functions taken to remove these and other distinctions from the content of a message are presented in Table II:

TABLE II

Message Content Normalization

| | |
|---|---|
| Case: | Content is converted to lowercase. |
| Whitespace: | Excess whitespace (single line breaks, tabs, multiple spaces, etc.) are coalesced with adjacent whitespace into a single space. Markers, identifiers, pointers, or other references are used to preserve identification of content line, paragraph, and sentence breaks. |
| Multiple Line Breaks: | For paragraph processing, multiple adjacent blank lines (paragraph boundaries) are coalesced into a single blank line. |
| Punctuation: | Punctuation is removed. Optionally, markers, identifiers, pointers, or other references may be used to preserve the possible significance of punctuation that occurs within words and numbers. |
| Extended character and Unicode: | For extended characters, the 8th bit is cleared. For Unicode, the characters are normalized to a standard character set. |
| SMTP headers: | SMTP header fields that are easily forged are ignored or stripped out. The contents of the subject line is maintained. An original source IP address may be maintained. |
| Numbers: | Any number of more than 5 consecutive digits is ignored. Well-formed numbers, such as telephone numbers, are maintained. Any single numbers at the end of a line or on a line by themselves are ignored. |
| Number of Lines: | All content beyond the first 25 lines (which is a tunable parameter) or 1K bytes (also tunable), whichever comes first is ignored as being outside the prime content area and easily randomized without impacting the UEM message. |
| Long words: | Single words longer than 32 characters (a tunable parameter) are likely to be a random character string and, therefore, are ignored. |

The normalizations presented in Table II are the currently preferred set of such normalizations. Additional normalizations may be developed, in a generally consistent manner, as UEM vendors develop new methods of affecting the presentation of their UEM messages in an effort to randomly vary the appearance of their messages to automated detection tools and, thereby, avoid detection as UEM messages.

Once normalized, a message is then passed to an array of algorithmic processors $48_{1-N}$ to generate signatures based on a variety of differently selected subsets of the message content. These subsets may be selected as named blocks, such as a particular header field, as non-overlapping blocks, such as lines, sentences and paragraphs, and overlapping blocks of words as may be selected through a sliding window. In the preferred embodiments of the present invention, the algorithmic processors implement computational, comparative, and other processes for generating signatures. Computationally-based signatures are preferably digests or other mathematical operations that produce signatures representing some corresponding subset of the message content. Many acceptable computational digests forms exist, including checksums, message digests, such as MD5, and cyclic redundancy checks, such as CRC-8 and CRC-32. Table III lists a preferred set of the computational algorithms, employing a preferred checksum digest form, usable in connection with the present invention.

TABLE III

Checksum-based Signature Algorithms

| | |
|---|---|
| Multiple Words: | Generate a checksum for each window group of four consecutive words (a tunable parameter) that occur within the window as the window is slid over the message content, where window group words are preferably exclusive of stop-list words (words, such as "and, or, this," that are non-contextual and as commonly defined in the literature concerning automated full-text searching systems). This is a preferred algorithm. |
| Lines: | Generate a checksum for each of the first 20 lines (a tunable parameter) that occurs within the message content, where each line is delineated by a line break in the original message content, preferably ignoring multiple line breaks and blank lines. |
| Sentences: | Generate a checksum for each sentence in the message content, where sentences are delineated by the occurrence of a period-space character combination in the original message content. |
| Paragraphs: | Generate a checksum for each paragraph in the message content, where paragraphs are delineated by multiple line breaks or text indents in the original message content. The subject line header field is preferably considered a separate paragraph. |
| Originating IP address: | Generate a checksum for the first or the apparent original source IP address given in the header fields of this message. |
| Single Byte Chunk: | Generate a checksum for the first 1000 bytes (a tunable parameter) that occurs in the message content, preferably exclusive of header fields. |
| Multiple Byte Chunks: | Generate a checksum for each of the first 10 blocks (a tunable parameter) of 100 bytes (also a tunable parameter) that occur in the message content, preferably exclusive of header fields. |
| Block Chunks: | Generate a checksum for the first 25 lines (a, tunable parameter) of the original message content, preferably exclusive of header fields and blank lines. |
| Line Chunks: | Generate a checksum for each set of 4 lines (a tunable parameter) of the message content, preferably exclusive of header fields and blank lines. |
| Sliding Window Chunks: | Generate a checksum for each set of 4 lines (a tunable parameter) sliding by 1 line (also a tunable parameter) of the message content, preferably exclusive of header fields and blank lines. |
| Authorized Words: | Generate checksums for the sets of words, numbers, and words and numbers that are also found on a defined word list empirically constructed or progressively developed to contain the most common words and numbers used in UEM messages. |
| High IDF Terms: | Generate a checksum for those terms that occur within the message content considered, preferably through statistical analysis, to be significant in identifying the message content. The most significant terms will preferably include unique descriptive phrases, specialized product and service names, email addresses, phone numbers, postal addresses, and URLs. |
| Unique Terms: | Generate a checksum for just the unique terms that occur within the message content, as determined against a common word-dictionary. The unique terms will preferably include specialized product and service names, email addresses, phone numbers, postal addresses, and URLs. |
| Call to Action Terms: | Generate a checksum for the words and short phrases identified from a list of known action words and phrases empirically defined or progressively identified from reviewed UEM messages to be within a "call to action," such as an email address, URL, phone number, and postal address. If three or fewer terms are found in the UEM message, do not generate a checksum. |

Although many effective algorithms may be based on checksum generated signatures, or digests in general, other algorithms for generating signatures can be equally if not more effective in identifying UEM messages. These other algorithms may be based on absolute and relative counts of the occurrence of particular words and phrases that occur in a message. An absolute count is defined as the number of terms, identified from a defined list, that occur within some portion of the message. A relative count is defined as the number of terms, also identified from a defined list, that occur within some portion of the message relative to the total number of comparable terms that occur within the same portion of the message. These defined lists may be statically defined or dynamically generated based on empirical or progressive reviews of UEM messages, or generated based on known texts. Table IV lists a preferred set of other algorithms usable in connection with the present invention:

TABLE IV

Adder Signature Algorithms

| | |
|---|---|
| Word Groups: | The signature is a value representing the percentage of word groups in the message that also appear in a master word group list. Preferably, each word group is a group of 4 successive words (a tunable parameter), excluding stop-words given by a predefined list. Further, the signature is preferably the percentage of those word groups that appear within the first 25 lines (also a tunable parameter) of the message that also appear in the master word group list. This adder value is empirically set, such as in a range of 0.25 and 2 points. |
| Predefined KeyWord Terms: | The signature is a true or false value reflecting the existence of any of a defined list of words in the subject line of the message. The defined list includes words such as "advertisement," "adv," "sale," "please read," and "chance of a lifetime." This adder value is empirically set, such as in a range of 0.25 and 2 points. |
| Legal Terms and Phrases: | The signature is the percentage of legal terms and phrases that appear within the message and also appear on a master legal term list. This master legal term list preferably includes terms selected from legally required UEM notices. Thus, for a notice that states, "This message is being sent to you in compliance with the proposed Federal legislation for commercial e-mail (S. 1618 - SECTION 301). "Pursuant to Section 301, Paragraph (a)(2)(C) of S. 1618, further transmissions to you by the sender of this e-mail may be stopped at no cost to you by submitting a request," the master legal term list preferably includes the terms: "301," "1618," "further transmissions to you by the sender," and "a 2 C". This adder value is empirically set, such as in a range of 0.25 and 3 points. |
| Improper Header Fields: | A signature is generated for each of several header fields. Each header signature is a true or false value reflecting whether the corresponding header field value is deemed to be improper, such as a blank "To:" field, a blank or invalid domain name in the "From:" field, and a blank or absent "X-Authenticated" field. This adder value is empirically set, such as in a range of 2 and 5 points for each improper header. |

The array of algorithmic processors $48_{1-N}$ preferably operate in parallel to generate a full signature record set of signatures based on a particular message. Each of these signatures is then passed to a final analysis processor 50 that composes a corresponding signature record set. Before storing the newly constructed signature record set to the signature database 18, the final analysis processor 50 preferably scans the signature record sets previously stored in the signature database 18 to determine whether a corresponding signature record set already exists in the signature database 18. The determination made is preferably whether or not there is a sufficient calculated degree of similarity, represented as a score, between the newly generated signature record set and those prior stored in the signature database 18.

Generally, where the similarity score produced by the comparison scan is above a pre-set threshold, the newly generated signature record set or a variant thereof is considered to already exist in the signature database 18. The newly generated signature record set is therefore discarded. Conversely, if the threshold level is not met, the newly generated signature record set is finalized and stored to the signature database 18.

In the preferred embodiment of the present invention, the comparison scan operates to compare a subset of the signatures taken from the newly generated signature record set with those present in the signature database 18. This comparison is constrained to only comparing signatures that are generated using the same algorithm. Thus, for example, a signature newly generated using a three-word sliding window algorithm is only compared against signatures in the database 18 that were previously generated using the same three-word sliding window algorithm. For the preferred embodiment then, no comparison correlation is made or respected between the newly generated signature record set, as a whole, and any prior stored signature record set. Alternate embodiments of the present invention may determine correlations based on a signature record set basis to obtain a possible higher level of validity to the matches made, but at greatly increased computational requirements. In either case, the count of comparison matches to comparisons made yields a ratio value on a per algorithm basis. A degree of similarity score is then produced from a preferably mathematically based combination of the ratio values.

In greater detail with reference to FIG. 2B, the determination process begins with the final analysis processor 50 first operating to select subsets of the signatures generated by several of the different algorithmic processors $48_{1-N}$ from the newly generated signature record set 56. The total number of signatures selected, the algorithms for which signatures are selected, and the number of signatures selected corresponding to a particular algorithm are preferably determined empirically. For example, one algorithm applied to an email May produce 200 signatures. A representative set of these signatures, for purposes of comparison, may be a randomly selected set of 10 or 20 signatures. Thus, the comparison scan may only employ 10 signatures generated by a three word sliding window algorithm, 15 generated by a line-selection algorithm, and 5 generated by a unique word selection algorithm. The selected signatures are then compared via a comparative analysis block 58 against signatures of like generated signature records retrieved from the signature database 18.

The ratio values determined through the comparison 58 are then analyzed through a match analyzer 59 to produce a degree of similarity score. While many different similarity algorithms may be used, based for example on statistical or stochastic analysis, relatively simple averaging algorithms are presently preferred. Table V provides a list of the preferred similarity detection algorithms usable in connection with the present invention:

TABLE V

Signature Combination Algorithms

| | |
|---|---|
| Averaging: | The checksum signature ratio match values are averaged together to provide a signature record level comparison score. This is a preferred algorithm. |
| Mean Tested Averaging: | The checksum signature ratio match values are first ranked against the mean value of the match values, weighted proportionately, and averaged together to provide a signature-set comparison score. |
| Differential Averaging: | The one highest and one lowest (both tunable parameters) checksum signature ratio match values are discarded and the remaining signature match values are averaged together to provide a signature-set comparison score. |

A predefined threshold similarity level, preferably programmable and stored by the final analysis processor 50, is then used to determine whether the currently generated signature record set should be stored to the signature database 18. If the degree of similarity computed for a newly generated signature record set is below the threshold, the record set is stored. Otherwise, the signature record set is discarded. For example, the newly generated signature record set 56 may include signatures generated by four algorithms, with each algorithm generating ten checksum signatures. The signature record sets previously stored in the signature database 18 may include signatures produced by four or more algorithms though including at least the four algorithms used in generating the current generated signature record set 56. If the comparisons between the signatures, on a per-algorithm basis, produce ratio match values of 8, 7, 9, and 5, the resulting degree of similarity score, using averaging, is 72.5%. Using differential averaging, the degree of similarity score is 75%. Finally, if the predefined threshold similarity level is set to 75%, inclusive, the newly generated signature record set 56 would be stored to the database 18 if the degree of similarity determination is defined as using averaging. Where the degree of similarity determination is defined as using differential averaging, the current generated signature record set 56 would be considered to be a sufficiently close variant of a prior recognized UEM message and, therefore, would be discarded.

In each case, however, a date/time-stamp is effectively updated for any signature prior stored in the signature database that matched a signature during the comparison scan. Thus, for preferred embodiments of the present invention where signatures are aged and progressively removed from the signature database 18, updating of the signature date/time-stamp values allows the signature database 18, as a whole, to track with the progression of variants of UEM received by the server 12.

Finally, in arriving at a similarity score, the use of only a subset of the signatures generated by the array of algorithmic processors $48_{1-N}$ for comparison against those stored by the signature database 18 serves a number of related purposes. By introducing an unpredictable variation in the particular set of signatures that will ultimately be used in screening received email messages, UEM vendors are unable to discern or reliably predict the essential criteria that would result in an email being compared and determined to be UEM. Additionally, using a subset whose algorithmic composition may equally change unpredictably, the introduction of new and additional algorithms is hidden from any UEM vendor who may try to discern or reliably predict UEM detection criteria.

An alternate preferred embodiment of the examination process is detailed in FIG. 2C. The final analysis processor 50 operates to compare the current signature record set 56, as generated by the algorithmic processors $48_{1-N}$, against a currently selected signature record set 57, previously stored in the signature database 18. The two signature record sets are preferably arranged, at least logically, into signature subsets $56_{1-N}$ and $57_{1-N}$. Each of the signature subsets $56_{1-N}$ contains the set of signatures produced by a respective algorithmic processor $48_{1-N}$. Likewise, the signature subsets $57_{1-N}$ contain the sets of signatures earlier produced by respective algorithmic processors $48_{1-N}$.

A comparative analysis block 58 preferably receives each of the signature subsets $56_{1-N}$, $57_{1-N}$ and performs signature comparisons between the paired subsets $56_{1-N}$, $57_{1-N}$ that correspond to a respective algorithmic processor $48_{1-N}$. As between algorithm matched subsets $56_X$, $57_X$, each signature in the subset $56_X$ is compared to each signature in the subset $57_X$. Subset totals of the number of identity signature matches and non-matches found are kept for each algorithm matched pairing of the subsets $56_{1-N}$, $57_{1-N}$. The resulting totals are then passed to a match analysis block 59 for a determination of whether to discard the signature record set 56 as being identical or sufficiently similar to a signature record set 57 already present in the signature database 18.

Referring again to FIG. 2A, the empirical selection of signatures for use in the comparison is preferably performed by an administrator through a local manager 52. This local manager 52 may be an administrative console attached to the server 12 or a separate administrative system. Preferably, the local manager 52 also operates to monitor the operation of the server 12 including generation of statistical and summary reports reflecting the operation of the server 12. The local manager 52 is also preferably responsible for establishing an aging algorithm for retiring signatures and potentially entire signature record sets from the signature database 18. Since only one or a small set of typically less than ten signature record sets are required to identify a particular UEM message and related variations, the storage capacity requirement for the signature database 18 16 is not great. However, individual UEM mass mailings tend to occur over relatively short periods, typically 1 to 5 days. Therefore, corresponding signature record sets can be considered to have a similarly limited effective life-span. Preferably then, the aging algorithm maintains signatures in the signature database 18 for an empirically selected aging period that may lost from one day to several weeks, with a preferred period of a few days, such as two to five days. The removal of signatures is accomplished by a periodic scanning of the signature database 18 and removing signatures whose date/time-stamps are older than the currently defined aging period.

The algorithmic processors $48_{1-N}$ that are not selected to produce signatures for new signature record sets preferably continue to generate signatures. The operation of such algorithmic processors $48_{1-N}$ is preferably maintained for a period of time at least equal to the aging period. Alternately, when an algorithm is retired, the signatures created using that algorithm are removed from the signature database. This tends if not actually ensures that signatures are retired before the corresponding generating algorithm is retired. Thus, the signatures generated against any given message are a proper superset of those stored by the signature record sets in the signature database 18 at any given time. The scan of the signature database 18 by the final analysis processor 50 for a matching signature record set can be performed irrespective of the particular subset of signatures selected for use in the current generation of signature record sets.

When a newly generated signature-set is finally identified by the final analysis processor 50 as representing a sufficiently different UEM message, the current generated signature record set is stored in the database 18. This record set as stored may include tuples storing a particular signature value and a versioned identification of the particular algorithm used to generate the signature. The date/time-stamp and other, optional data is preferably stored with the signature value at this time. The other data may include signature record generation dates, other data identifying or characterizing the signature or some aspect of the content from which the signature was generated, and data that may be used in support of the aging of the signature, the associated signature record, or full signature record set.

The signature record set is also provided to an update manager 54 for use in a hot update of the client systems 14, 14'. In the preferred embodiments of the present invention, the operation of the update manager 54 is ultimately defined by the local manager 52 and administrator. Preferably, this defined operation is a relatively continuous process of serving hot updates of newly identified signature record sets to the client systems 14, 14'. This is desired in order to minimize the latency from the first receipt of a message from a new UEM mailing campaign to the updating of the client systems 14, 14'.

In a preferred embodiment of the present invention, the hot updates are dynamically sourced by the update manager 54 over the Internet 22 to the client systems 14, 14'. A conventional hot update system and proprietary communications protocol may be used. A hot update message will likely contain a single signature record set and, therefore, may be relatively small and quickly delivered. The record set size may be further reduced by sending only those signatures that did not match against the signature database 18 and updated date/time-stamps for those that did match. A hot update message may also include new or updated algorithms for use by the client systems 14, 14'. That is, any time a new or modified algorithm is adopted by the server 12 for use by one of the algorithmic processors $48_{1-N}$, the algorithm is concurrently provided to the clients 14, 14'. Preferably, the hot update communications protocol is secure, such as through the use of an encryption protocol, to protect the content of the hot updates.

Figure 3:
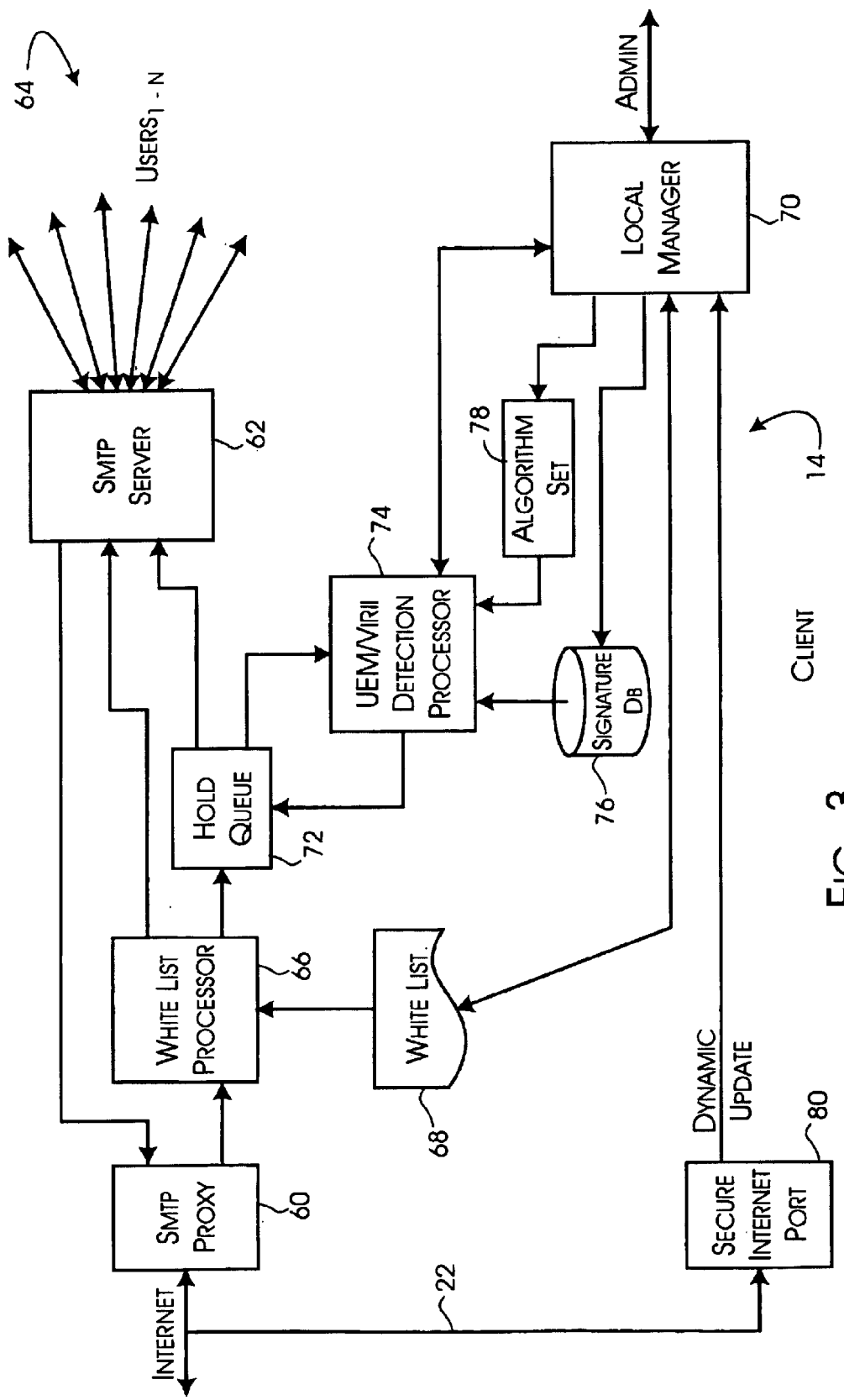
FIG. 3 is a block diagram of an email filter client constructed in accordance with a preferred embodiment of the present invention.

Referring now to FIG. 3, the client system 14, representing the client systems 14, 14', is shown in greater detail. A SMTP proxy server 60 is installed in place of a conventional SMTP server 62 that is used as an email routing relay for a community of $Users_{1-N}$ 64. In a preferred embodiment of the present invention, the SMTP proxy 60 operates to route email messages inbound from the Internet to a white list processor 66. A white list 68, which is accessible by the white list processor 66, is managed by a local manager 70 under the control of a client site administrator. This local manager 70 may be an administrative console attached to the server 14 or a separate administrative system. Preferably, the local manager 70 also operates to monitor the operation of the server 14 including generation of statistical and summary reports reflecting the operation of the server 14. Using the local manager 70, the client site administrator can manage a set of white list entries, typically consisting of some set of domain names and email addresses corresponding to sites and individual correspondents that are trusted not to be a source or forwarder of UEM messages. Thus, the white list processor preferably operates to examine each message received from the SMTP proxy to determine if the "From:" domain or email address is on the white list 68. If present, the message is passed directly to the SMTP server 62 for eventual distribution to an end-user 64.

All other inbound email messages are next passed, in a preferred embodiment of the present invention, to a hold queue 72. A UEM detection processor 74 operates on messages as entered into the hold queue 72 to determine whether the message corresponds to any signature record set stored in a client signature database 76. This detection process is performed generally in three steps: first, a client signature record set, reflecting the contents of a particular queued message, is generated and a scan comparison is made between a signature-set of the client signature record set and the signatures stored in the signature database 76; second, a similarity score is generated for the client signature-set; and third, a preferably threshold-based determination is made to determine whether the similarity score credited to the client signature record set is sufficient to consider the corresponding email message to be a known UEM message.

Preferably, the generation of the client signature-set is performed by an array of algorithmic processors, provided within the UEM detection processor 74, that is essentially identical to the array $48_{1-N}$. The UEM detection processor 74 also effectively includes at least that portion of the final analysis processor 50 that operates to collect the signatures generated by the array $48_{1-N}$, accesses the signature database 18, and performs the scan comparison to identify matching signatures in order to generate a similarity score, essentially in the same manner as performed by the server 12. This includes determining the ratio of matching checksum signatures found, normalizing, as appropriate, the ratio identity value, and adding any "adder" values to determining a final similarity score, as described above in connection with the operation of the final analysis processor 50.

Finally, based on the generated score, a client-site determination is made as to whether a scored message is a UEM message. In preferred embodiments of the present invention, a score threshold value is established by the client site administrator through a local manager 70. Messages having scores higher than the threshold value are considered to be UEM messages and dealt with in a manner determined by the client site administrator. Preferably, the options are to drop the UEM messages completely, to distinctively mark the message as UEM and thus delegate the further handling of the messages to the user-client email client applications, and to maintain a UEM message in the hold queue 72 pending review by the client site administrator.

Preferred embodiments of the present invention allow the client site administrator to set and manage through the local manager 70 multiple threshold values to support discrimination between different handling options. For example, a high threshold may be set to immediately drop UEM messages detected with a very high degree of certainty. One or more intermediate threshold values can be set to filter between messages that should be marked differently as UEM messages, such as with different rating numbers reflecting different likelihoods that the message is UEM. A low threshold value may be set to filter for all messages that are at least above a suspect threshold as bing UEM messages.

An algorithm set store 78 is preferably used to manage the current set of algorithms usable by the UEM detection processor 74. Both the signature database 76 and algorithm set store 78 are preferably hot-updateable from the server 12. In preferred embodiments of the present invention, the hot-update protocol is used to access a secure internet port 80 on the client system 14 and transfer updates to the local manager 70. In turn, the local manager 70, in a preferably automated process, stores the signatures of new signature record sets in the signature database 76 and new and updated signature algorithms, including their related parameters, in or through the algorithm set store 78.

The hold queue 72 can also be used to implement a delay function. In an alternate preferred embodiment of the present invention, the examination of messages entered into the hold queue 72 may be intentionally delayed. By forcing a delay before the UEM detection processor 74 begins the evaluation of a message newly entered into the hold queue 72, an opportunity is provided for the server 12 to notice any newly started UEM mass emailing and to generate and distribute corresponding signature record sets to the client systems 14, 14'. Preferably, the delay imposed is a variable parameter that can be set by the client site administrator though the local manager 70. In preferred embodiments of the present invention, the period of the delay may be set between 0 and 30 minutes, with a typical setting of between 5 and 15 minutes.

In a presently preferred embodiment of the present invention, however, the delay is set at 0 provided a sufficient number of decoy email addresses have been deployed for a period of time sufficient to expect that many have been harvested. As a result, there is a substantial statistical chance that a decoy address will be in the first 1 to 5 percent of the email addresses used in a new UEM mass mailing campaign. Given that the latency of the server 12 in generating a corresponding and distributing a new signature record set, plus the latency of the clients 14, 14' in installing the signature record set, is relatively small in comparison to the progression of a UEM mass mailing, the clients 14, 14' will be updated in time to block at least 90% of any new UEM messages. A quite reasonably expected blockage rate of 98% is attained. This number is reached by assuming that the number of decoy addresses are sufficient to reasonably have the occurrence of a decoy address within the first 1% of the UEM mass mailing and assuming that the combined server 12, client 14, 14' latency only allows another 1% of the UEM mass mailing to be delivered without detection. Even with a successful delivery rate of 10%, however, most UEM vendors should find that their UEM mass mailings are prohibitively ineffective to pursue.

Figure 4:
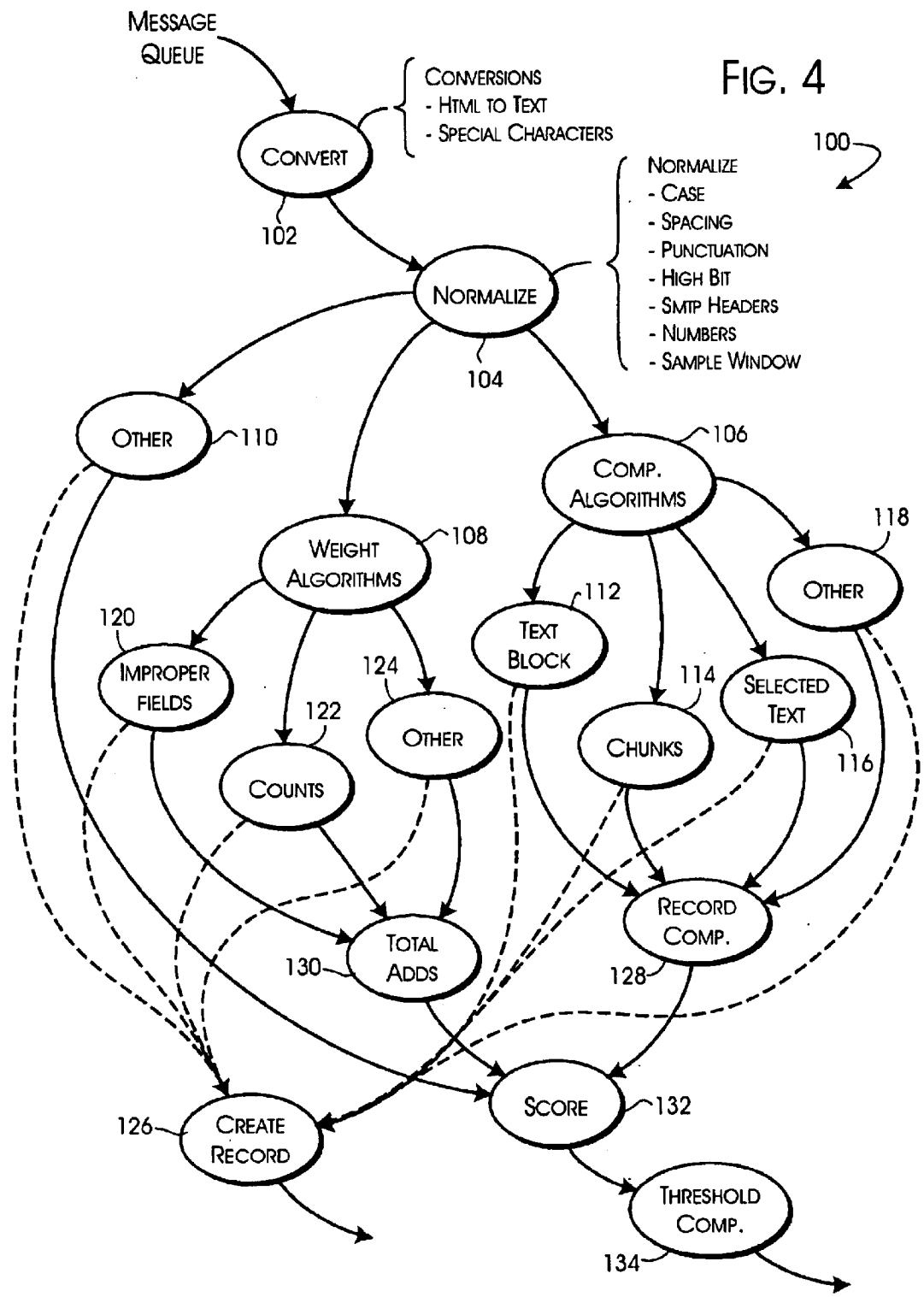
FIG. 4 is a process flow diagram illustrating the analysis of email messages in accordance with a preferred embodiment of the present invention.

FIG. 4 details, in flow diagram form, the process 100 of creating a signature record set by a server system 12 and scoring a message by a client system 14, 14'. Although performed for different ultimate purposes by the server 12 and client 14, 14' systems, the process 100 nonetheless utilizes substantially the same steps. The process 100 begins with a single message, which is first converted 102 to a plain text form (Table I) and then normalized 104 to conform (Table II) the content to a standard presentation. The message content is then evaluated through computationally based algorithms 106, weight-based algorithms 108, and any other algorithms 110.

The computationally based algorithms 106 (Table III) include text block 112, chunking 114, selected text 116, and other 118 algorithms that operate to generate signatures based on a computation, such as checksums. Weight oriented algorithms 108 (Table IV) include improper field checking 120, count-based signatures 122, and other algorithms 124.

The use of the process 100 by a server system 12 next collects 126 the various generated signatures into a newly generated signature record set. A determination then made to store the signature set record in the database 18 where a generated similarity score is below a pre-set threshold. When a record set is stored to the database 18, the signature record set is stored and hot updated to the client systems 14, 14'. Changes in the current set of algorithms used, scoring parameters, and other data used by the algorithmic processor array $48_{1-N}$ are also included in the hot update.

The process 100, as used by the client systems 14, 14', preferably relies on the scoring parameters provided for the specific algorithms 112–124 to determine the similarity score for the message being evaluated. The computational 128 and weighted adds 130 components of the score are tallied and then combined 132 to produce a final similarity score for the message. Based on pre-established score thresholds, a score comparision 134 is performed and an appropriate action is then taken, such as dropping the message or marking the message with a relative indicator of the likelihood that the message is a UEM message.

Thus, methods and a system for identifying UEM messages and supporting the filtering of such messages from the desired stream of inbound email has been described. While the present invention has been described particularly with reference to the filtering of electronic mail, the present invention is equally applicable to other and future forms of communications that operate on the basis of distributed public addresses for user-to-user communications.

In view of the above description of the preferred embodiments of the present invention, many modifications and variations of the disclosed embodiments will be readily appreciated by those of skill in the art. In particular, the nature of the content normalization processes may be readily adapted to handing other and new content presentation conventions and may be adjusted to convert message content to a defined form other than plain/text. Additionally, the algorithms may be permuted in various manners to provide a renewable source of different distinct signatures and new algorithms, provided they create reproducible signatures, may be introduced at any time. Also, UEM should not be construed as restricted to just email transported by the simple mail transfer protocol (SMTP). Rather, UEM should be understood to include other message types where a server or proxy can be placed or executed in the transport path of these messages. It is therefore to be understood that, within the scope of the appended claims, the invention may be practiced otherwise than as specifically described above.

What is claimed is:

1. A method of detecting unsolicited email comprising the steps of:

a) generating a signature set, for a received email message, containing a plurality of encoded signatures corresponding to a plurality of content portions of said email message;

b) performing a lookup of the individual encoded signatures of said signature set against a database storing a plurality of reference signatures, wherein said plurality of reference signatures includes encoded signatures corresponding to respective content portions occurring in any of a plurality of predetermined unsolicited email messages and wherein each of said plurality of reference signatures is accessed by said step of performing a lookup independent of reference to an individual one of said plurality of predetermined unsolicited email messages;

c) first determining a score value for said received email message calculated as a representative percentage match between said signature set and said plurality of reference signatures; and d) second determining whether said score value is greater that a predetermined threshold value, whereby said email message is qualified as unsolicited email.

2. The method of claim 1, wherein said step of generating generates a plurality of signature sets including a first said signature set wherein said plurality of encoded signatures correspond to a plurality of overlapping, multi-word content portions of said email message and a second said signature set wherein said plurality of encoded signatures correspond to non-overlapping, multi-word content portions of said email message occurring at predefined locations within said email message, wherein said database stores a first plurality of said reference signatures corresponding to respective like overlapping, multi-word content portions of any of said plurality of predetermined unsolicited email messages and a second plurality of said reference signatures corresponding to non-overlapping, multi-word content portions of any of said plurality of predetermined unsolicited email messages occurring at predefined locations within said plurality of predetermined unsolicited email messages, and wherein said step of performing performs said lookup of signatures by looking up signatures of said first said signature set against said first plurality of said reference signatures and by looking up signatures of said second said signature set, respectively by like predefined location, against said second plurality of said reference signatures.

3. The method of claim 2 wherein said step of first determining determines said score value for said received email message based on a calculated signature match value for each like pairing of said signatures between said first said signature set and said first plurality of said reference signatures and between said second said signature set and said second plurality of said reference signatures.

\* \* \* \* \*